United States Patent [19]

Wade

[11] 4,404,122

[45] Sep. 13, 1983

[54] PREPARATION OF SUPPORTED ALKALI METAL BOROHYDRIDE REAGENTS

[75] Inventor: Robert C. Wade, Ipswich, Mass.

[73] Assignee: Thiokol Corporation, Chicago, Ill.

[21] Appl. No.: 360,075

[22] Filed: Mar. 19, 1982

[51] Int. Cl.$^3$ .................... B01J 21/02; B01J 23/04
[52] U.S. Cl. .................................................. 252/432
[58] Field of Search ..................... 252/432; 423/286

[56] References Cited

U.S. PATENT DOCUMENTS 2,728,757  12/1955  Field et al. ................... 252/432 X

OTHER PUBLICATIONS

Santaniello et al., *Synthesis*, pp. 891–892, (1978).

Santaniello et al., *Synthesis*, p. 912, (1979).

*Primary Examiner*—W. J. Shine
*Attorney, Agent, or Firm*—Gerald K. White

[57] ABSTRACT

Supported alkali metal borohydride reagents are prepared by contacting high surface area solid support material with a solution of alkali metal borohydride in an anhydrous aprotic solvent so as to form a coating and then removing the solvent to leave a residual coating that is predominantly composed of alkali metal borohydride on the surface of the support material. Supported reagents containing for example, greater than 10 wt. % of a thin alkali metal borohydride coating, based upon total weight coating and support material, are advantageously prepared by the procedure of the invention.

11 Claims, No Drawings

PREPARATION OF SUPPORTED ALKALI METAL BOROHYDRIDE REAGENTS

BACKGROUND OF THE INVENTION

Supported reagents have gained increased use during recent years and have found wide application in the fields of organic and inorganic chemistry, biochemistry, and biology. In particular, supported alkali metal borohydrides, especially sodium borohydride, have been shown to possess great value as reducing agents. The use of such reagents leads to many advantages over the use of unsupported reagents. For example, the effective reaction area and rate is increased and the entropy of activation lowered. Other advantages of supported reagents include: simplified reaction work-up because the spent reagent can usually be removed by simple filtration, greater selectivity than the corresponding homogeneous reaction, milder reaction conditions, and the ability to recover and recycle reagents. In the case of supported sodium borohydride reagents, it has been observed that the by-product of its use in chemical reductions, sodium borate, is substantially retained upon the support, thereby minimizing contamination of the reaction solvent with boron-containing residues.

E. Santaniello, F. Ponti, and A. Manzocchi, *Synthesis*, 891, Dec. 1978 reported a technique for adsorbing an aqueous solution of sodium borohydride onto alumina followed by drying to yield a powdered reagent containing about 10% sodium borohydride. Such reagent is useful to reduce aldehydes and ketones in non-aqueous solvents such as ether, benzene, or ethylacetate, in yields over 80%. Normally, sodium borohydride reduction in these solvents is impractically slow. Other examples of supported borohydride reagents are given by F. Hodosan and N. Suban, *Rev. Roumaine Chim.*, 14, 121 (1969); E. Santaniello, C. Farachi, and A. Manzocchi, *Synthesis*, 912 (1979); and V. Ciurdaru and F. Hodosan, *Rev. Roumaine Chim.*, 22, 1027 (1977).

The prior method of preparing supported alkali metal borohydride reagents has been very cumbersome, dangerous and, extremely wasteful of the expensive borohydride reagent. This method involves preparation of an aqueous solution of the borohydride reagent which is then added to a dry support such as alumina or silica with good mixing, followed by vacuum evaporation of the majority of the water, followed by more complete water removal by storing the reagent in a $P_2O_5$ dessicator for several days. Only very small quantities of the reagents can be prepared with this procedure. Thus such procedure is unsatisfactory when attempting to prepare supported reagents on a larger scale. When aqueous solutions of sodium borohydride are added to an anhydrous alumina support the reaction becomes extremely hot, hydrolysis of the sodium borohydride takes place causing decomposition of a substantial part of the expensive reagent and also causing rapid evolution of copious and hazardous amounts of hydrogen. The hydrogen then must be safely removed from the reaction zone. The hydrolysis reaction is:

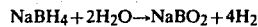

$$NaBH_4 + 2H_2O \rightarrow NaBO_2 + 4H_2$$

Also, the resulting product is contaminated with large amounts of the hydrolytic decomposition product, sodium borate. In attempts to prepare sodium borohydride on silica on a kilogram scale, the hydrolysis reaction has become so violent that explosions have occurred, and it consequently, became impossible to use the aqueous process. Also, all of the $NaBH_4$ was lost due to hydrolysis.

SUMMARY OF THE INVENTION

This invention provides a solution to the manufacturing problems mentioned above and also permits the preparation of a product having a greater concentration of alkali metal borohydride than is possible with prior techniques. The method of the invention generally involves contacting a high surface area solid support material that is essentially non-reactive with alkali metal borohydrides with a solution of an alkali metal borohydride in an anhydrous aprotic solvent to form a coating of the solution upon the surface of the support material, and then removing the solvent portion of the coating. This procedure results in a thin residual coating or film composed predominately of alkali metal borohydride on the surface of said support material. Novel and highly advantageous supported alkali metal borohydride reagents having high borohydride concentrations such as in excess of 10 wt% may be prepared on a kilogram scale with use of the inventive method.

DETAILED DESCRIPTION OF THE INVENTION

It has now been discovered that most of the problems encountered using the prior aqueous techniques for preparing supported borohydride reagents such as sodium or potassium borohydride, can be substantially overcome by using an anhydrous aprotic solvent; for example, liquid ammonia, and, preferably predrying the support to remove adsorbed water. Sodium borhydride has a very high solubility in liquid ammonia and hence, such solvent is preferred. For instance at 25° C., 104 grams of $NaBH_4$ will dissolve in 100 g of liquid ammonia. Removal of this aprotic solvent from the mixture is much easier than removal of water because ammonia boils at about $-33°$ C. Because the solvent contains no protons and is a basic material in the presence of water, the wasteful and dangerous hydrolysis reaction is substantially suppressed. Other aprotic solvents that could be utilized in the practice of the invention include alkyl amines, such as methylamine, dimethylamine, or trimethylamine; dimethylsulfoxide; dimethylacetamide; polyethers; and like anhydrous aprotic solvents.

A high surface area solid support material such as alumina, zirconia, magnesia, or silica gel or the like has been found to be suitable for use in the invention. A surface area of at least about 2 $m^2/g$ is typically utilized in the practice of the invention. The support material should be essentially nonreactive with the alkali metal borohydride. Another source of undesirable protons which can still cause some hydrolytic decomposition of the alkali metal borohydride is from adsorbed water on the support material, or from Al-OH or Si-OH groups which are chemically part of the support material. Therefore, predrying the support material is desirable prior to contacting the support material with the alkali metal borohydride solution. Suitable drying conditions to reduce the water content of the support to less than 0.1 wt% can be obtained by drying in a vacuum oven at 80° C. or, alternatively drying in a forced hot air oven at 125° C. for a period of from 4 to 16 hours, followed by cooling to ambient temperature under an atmosphere of dry nitrogen.

The supported reagent of the invention comprises a thin coating composed predominantly of an alkali metal borohydride on the surface of a high surface area solid support material; the alkali metal borohydride being present in a desired amount, typically greater than 1 wt.%, based upon the total weight of coating and support material. Typical products include from about 1 wt% to 30 wt% of the borohydride. A preferred range is from greater than 10 wt% to 20 wt% because such range constitutes a practical and economically attractive concentration when the supported reagent is used in chemical reductions. These concentrations are believed to only be attainable through practice of this invention.

The following examples illustrate the improvements attainable by practice of the invention as well as several modes of practice of the invention.

EXAMPLE 1

1269.8 g of aluminum oxide [−60 mesh, activated basic $Al_2O_3$] was dried in a vacuum oven at 80° C. until 256 g of adsorbed water was removed. 500 grams of this dried material was placed in a flask equipped with a stirrer. Then a solution of 72 grams of $NaBH_4$ in 145 ml of water was added with stirring to the flask. A substantial amount of heat was generated with large quantities of hydrogen being evolved. It was necessary to cool the flask in an ice bath. The mixture was stirred for 4 hrs. Then water was removed by vacuum evaporation at 50° C. for 4 hrs. 595 grams of white solid which contained about 6.3% $NaBH_4$ when analyzed by hydrogen evolution was recovered. Thus about 48% of the borohydride was hydrolyzed.

EXAMPLE 2

450 grams of silica gel was charged to a stirred flask and 90 grams of $NaBH_4$ dissolved in about 200 ml $H_2O$ was then added. The reaction mix quickly became very hot, the contents of the flask erupted with the evolution of huge quantities of hydrogen. The run was abandoned.

EXAMPLE 3

A 22 liter three neck flask, equipped with a stirrer, dry ice condenser and gas addition tube was charged with 3500 grams of silica gel which had not been predried. Sufficient liquid ammonia was added until the slurry mixture could be stirred. An addition funnel, to which was attached a dry ice condenser, was attached to the reaction flask. The addition funnel was charged with 1230 grams of $NaBH_4$ dissolved in 1 liter of liquid $NH_3$. The borohydride solution was added to the stirred slurry as fast as the reflux of the ammonia would permit. When the addition was complete, ammonia was removed by $N_2$ purge followed by heating gently under vacuum. There was obtained about 5 kilograms of product containing 15% $NaBH_4$.

EXAMPLE 4

3500 grams of activated, neutral $Al_2O_3$ was charged to the 22 liter flask equipped as described in example 3. To this support material was added enough liquid $NH_3$ to make a stirrable slurry. Then 1230 grams of $NaBN_4$ dissolved in about 1500 ml liquid $NH_3$ was added with stirring as fast as the refluxing $NH_3$ would permit. After stirring and removal of the ammonia there was recovered a powdered product containing 17% $NaBH_4$. About 35% of the sodium borohydride hydrolyzed.

EXAMPLE 5

3.5 kilograms of silica gel were predried at 125° C. in a hot air oven, then cooled to room temperature under dried nitrogen gas. The gel was placed in an open head 5 gallon tank equipped with a stirrer and chilled to −33° C. Then liquid ammonia was added to the tank until a stirrable slurry was obtained. 1500 g of $NaBN_4$ powder was then added to the stirred slurry. Agitation was performed for 1 hr. allowing the $NaBH_4$ to dissolve in the liquid ammonia phase. Ammonia was evaporated under a stream of nitrogen until substantially removed. The final powder was heated to 50°–60° C. under nitrogen to complete the removal of $NH_3$. There was obtained a quantitative yield of product which analyzed 25% active $NaBH_4$ by hydrogen evolution. By predrying the silica and using the liquid ammonia solvent, the hydrolytic loss of $NaBH_4$ is greatly reduced amounting to about 17% of the $NaBH_4$.

EXAMPLE 6

Excellent results were also obtained with $Al_2O_3$ using the identical process, except for predrying the alumina, as used in Example 5. Only a 10% loss of $NaBH_4$ due to hydrolysis occurred. This loss is believed to be due to Al-OH moieties in the alumina which cannot be removed by simple drying.

The above examples are considered to demonstrate that the use of anhydrous aprotic solvents offer considerable advantages over the use of an aqueous system in the preparation of supported alkali metal borohydride reagents.

I claim:
1. A method for preparing a supported alkali metal borohydride reagent, comprising: contacting a high surface area solid support material that is essentially non-reactive with alkali metal borohydrides with a solution of an alkali metal borohydride in an anhydrous aprotic solvent so as to form a coating of said solution on the surface of said support material; and then removing the solvent so as to result in a thin residual coating composed predominantly of said borohydride on the surface of said support material.
2. The method of claim 1, wherein: said support material is a member selected from the group consisting of alumina, zirconia, magnesia, and silica.
3. The method of claim 2, wherein: said support material is alumina.
4. The method of claim 2, wherein: said support material is silica.
5. The method of claim 1, wherein: said alkali metal borohydride is sodium borohydride.
6. The method of claim 1, wherein: said support material has a surface area of at least about 2 $m^2/g$.
7. The method of claim 1, wherein: said solvent is a member selected from the group consisting of liquid ammonia, alkyl amines, dimethylsulfoxide, dimethyl acetamide, and polyethers.
8. The method of claim 7, wherein said solvent is liquid ammonia.
9. The method of claim 1, wherein: said alkali metal borohydride is present in an amount from 1 to 30 wt.%, based upon total weight of residual coating and support material.
10. The method of claim 9, wherein: said alkali metal borohydride is present in an amount from greater than 10% to 20 wt.%.
11. The method of claim 1, which further includes the step of predrying the support material prior to contacting said support material with said alkali metal borohydride solution.

* * * * *